United States Patent [19]
Bopardikar

[11] Patent Number: 6,055,354
[45] Date of Patent: Apr. 25, 2000

[54] DATA STORAGE APPARATUS

[75] Inventor: Raju C. Bopardikar, Cambridge, Mass.

[73] Assignee: Discreet Logic Inc., Montreal, Canada

[21] Appl. No.: 08/838,738

[22] Filed: Apr. 11, 1997

Related U.S. Application Data

[60] Provisional application No. 60/015,410, Apr. 15, 1996, and provisional application No. 60/015,469, Apr. 15, 1996.

[51] Int. Cl.[7] .................................................. H04N 5/76
[52] U.S. Cl. .......................... 386/46; 386/109; 386/125
[58] Field of Search ............................. 386/46, 125, 126, 386/111, 109, 112, 124, 131; 345/328; 348/7; H04N 5/76

[56] References Cited

U.S. PATENT DOCUMENTS

| | | | |
|---|---|---|---|
| 4,577,240 | 3/1986 | Herdberg et al. | 386/125 |
| 5,469,308 | 11/1995 | Hamoda et al. | 360/71 |
| 5,510,905 | 4/1996 | Birk | 386/125 |
| 5,530,557 | 6/1996 | Asit et al. | 386/125 |
| 5,559,764 | 9/1996 | Chen et al. | 386/125 |
| 5,583,653 | 12/1996 | Timmermans | 386/125 |
| 5,598,276 | 1/1997 | Cookson et al. | 396/126 |
| 5,671,386 | 9/1997 | Blair et al. | 395/405 |
| 5,719,985 | 2/1998 | Ito et al. | 386/125 |
| 5,754,730 | 5/1998 | Windrem et al. | 386/125 |

*Primary Examiner*—Huy Nguyen
*Attorney, Agent, or Firm*—Nixon & Vanderhye P.C.

[57] ABSTRACT

Video data storage apparatus includes a plurality of storage disks arranged to store portions of video frames. Incoming data is analysed to determine the number of storage devices required to store a frame. The data is then written to the storage devices as so determined. In addition, in accordance with the size of an incoming frame, the size of each stripe may also be modified. By adjusting the number stripes and the size of each stripe it is possible to write the optimum amount of data to each stripe thereby enhancing the transfer characterstics.

20 Claims, 6 Drawing Sheets

DATA STORAGE APPARATUS

This application claims the benefit under 35 U.S.C. 119(e) of the application Nos. 60\015,410 and 60\015,469, both filed on Apr. 15, 1996.

The present invention relates to storing data, in which a plurality of storage devices are individually accessible.

INTRODUCTION

Magnetic, magneto-optical and optical disks have become an established medium for recording machine readable data. Read only optical disks are particularly attractive in environments where data is required in permanent form, thereby allowing multiple read operations to be executed using relatively low cost equipment. Such disks are particularly suitable for storing computer programs and similar data that does not change over a significant period of time.

Many types of data, as distinct from computer programs, change as modifications are made in response to operator manipulations. Thus, for example, image data may be stored in machine readable form with a file allocated for each individual image frame. A moving video clip may then be accessed, manipulated or replayed by reading a sequence of such files and performing, where appropriate, digital to analogue conversions at video rate. Furthermore, it is known to perform image data manipulations so as to create special effects, allow re-touching or painting operations to be performed or to allow video clips to be assembled as part of an editing procedure. Such operations require data to be read from storage and then re-written back to storage such that, over a period of time, data read and write operations will be executed as work progresses towards producing a final output. For such operations re-writable disk technologies, such as magnetic or magneto-optical disks, are used.

As processing operations have become more sophisticated and operations are being performed on higher data volumes, particularly in the field of image processing, the amount of data transferred during read and write operations has increased significantly. In order to compete with hardware specifically designed for manipulating video data, it is necessary for data to be transferred from storage at a rate which allows the image frames to be displayed at normal rate, a mode of operation often referred to as real time or video rate. Under these circumstances, the amount of data being moved over unit time is considerable, placing a bandwidth requirement upon the storage medium which far exceeds that available from transfer rates obtainable from a single rotating magnetic disk. Under these circumstances, it has become known to group a plurality of disks together in the form of an array such that multiple disk accesses are made simultaneously to allow data streams to be constructed from a plurality of parallel storage paths.

The process of simultaneously writing data to a plurality of disks is known in the art as "striping". The term is particularly appropriate for describing the operations executed when transferring image data, in that an image frame may be divided into a plurality of horizontal "stripes", which are then simultaneously written to several disks in parallel. Ideally, the number of stripes present within an image frame will be equal to the number of storage devices present within the array such that a single parallel disk access operation will result in a whole frame of data being written to disk or read from disk in response to a single disk access instruction. Such a procedure significantly reduces system overhead and thereby extends the bandwidth capability of the system, such that a sequence of video frames may be written to the array or read from the array at video rate.

Systems of this type are typically based on a principle known as a redundant array of inexpensive disks (RAID). In such an array, data is partially duplicated on a redundant disk, such that data may be recovered in the event of a disk access error, or even if a particular disk drive breaks down completely. As data volumes stored on an array of such disks increase, the likelihood of such an event occurring increases, and it is necessary for such procedures to be available if data is not to be irretrievably lost. Moving image data, such as that used to represent a television signal in the established NTSC or PAL formats, or the more recent high definition television (HDTV) format, generates such a considerable volume of data, that failures of this type are to be expected.

Thus, the RAID concept allows large amounts of data, as required for video editing, to be stored on disks; as an alternative to the more traditional digital D1 video tape format. However, a problem with known RAID implementations is that the logical arrangement for striping the disks is fixed in accordance with a particular signal requirement. Thus, in order to store high definition television signals in a RAID, it is necessary to define a portion of disk space for a specific type of signal. Storage for other types of signal are defined separately. Thus, on a day when only NTSC type video images are to be stored and edited, the portion of the RAID assigned for storing HDTV signals is wasted.

SUMMARY OF THE INVENTION

According to a first aspect of the present invention, there is provided video data storage apparatus, comprising input means, storage means and processing means, wherein said input means receives video frames at a rate substantially equal to or greater than video display rate, said storage means comprises a plurality of storage devices each arranged to store portions of video frames, and said processing means is configured to analyse the size of an incoming frame, determine the number of storage devices required to store said frame and write respective portions of said frame to said required storage devices.

In a preferred embodiment, the processing means is also configured to modify the size of each stripe in response to the size of each incoming frame. In this way, it is possible to accommodate any size of frame while optimising the size of each stripe.

Preferably, the storage devices are configured as a plurality of sub groups and the total number of storage devices used consists of a whole number of said sub groups. Preferably, each sub group includes a parity device for storing redundant information.

In a preferred embodiment, the storage devices are magnetic disks, although optical disks, solid state devices or any other type of storage medium may be used.

According to a second aspect of the present invention, there is provided a method of storing video data, in which video frames are received at a rate substantially equal to or greater than video data display rate, and said frames are striped and stored on a plurality of storage devices, wherein each of said devices is arranged to store a portion of said video frames, and the size of an incoming frame is analysed to determine the number of storage devices required to store said frame, whereafter said divided portions are written to the required storage devices.

The video data may be generated by scanning cinematographic film or alternatively it may be derived from video sources, such as high definition video frames, broadcast quality video fields or compressed video data.

DETAILED DESCRIPTION OF THE PREFERRED EMBODIMENTS

Preferred embodiments of the invention will now be described by way of example only with reference to the accompanying drawings identified above.

Figure 1:
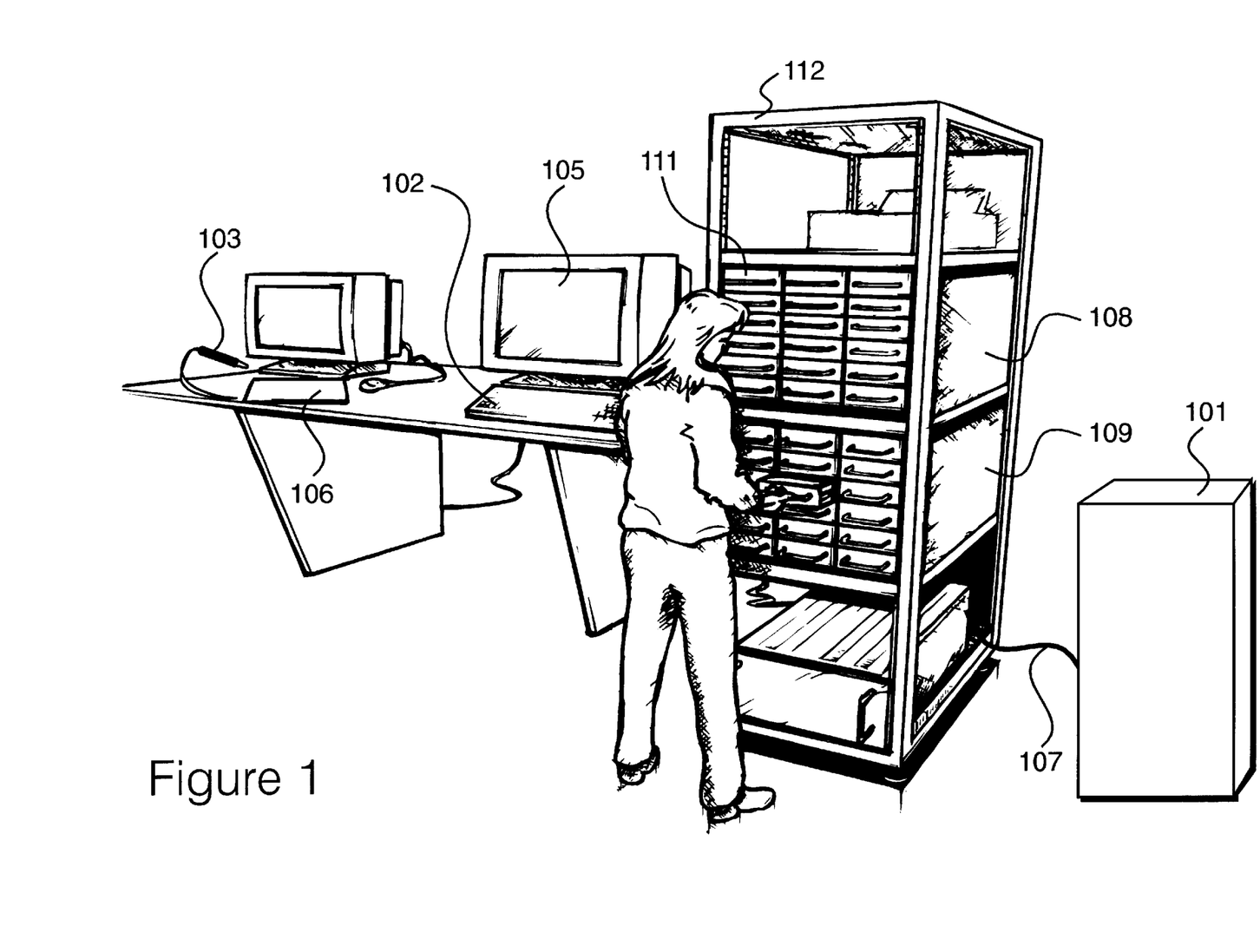
FIG. 1 shows an image data processing environment, including a graphics processor and an array of disk drives.

An image data processing environment is shown in FIG. 1, in which an image processing device 101 receives input commands from manually operable devices, including a keyboard 102 and a stylus 103. In the preferred embodiment, the image processing device 101 is an SGI Onyx, manufactured by Silicon Graphics Incorporated. A video image is displayed on a monitor 105 and modifications, special effects and edits are defined in response to manual operation of the stylus 103 upon a touch tablet 106. The environment may be similar to those marketed by the present Assignee under the trademarks "INFERNO", "FLAME" and "FLINT".

The image processing device 101 includes internal storage, allowing a plurality of image frames to be retained locally for subsequent manipulation and editing. In addition, the image processing device includes a connection 107 arranged to supply image frames at video rate (or higher), thereby substantially increasing the extent to which video manipulations may be effected within the environment, without requiring local data transfers.

Connection 107 consists of a plurality of Fast Wide Differential SCSI cables connected to two physical arrays of disk drives 108 and 109; individual disk modules 111 are housed within a rack 112. It is accepted that, over time, problems will occur with specific disk drive modules 111, either in terms of part of the disk becoming damaged or the entire disk module 111 becoming totally inoperable, a condition often referred to as a "head crash". The disks are therefore configured as a redundant array of inexpensive disks (RAID) such that parity data is generated when data is written to the array, allowing any individual disk to be replaced if a head crash occurs without any data actually being lost.

As shown in FIG. 1, a damaged disk is removed from the array for replacement with a similar unit. Procedures are then invoked to read parity data, in combination with all of the remaining image data, so as to reconstitute the lost data and to re-establish the data in the array as being protected against similar future drive malfunction.

Figure 2:
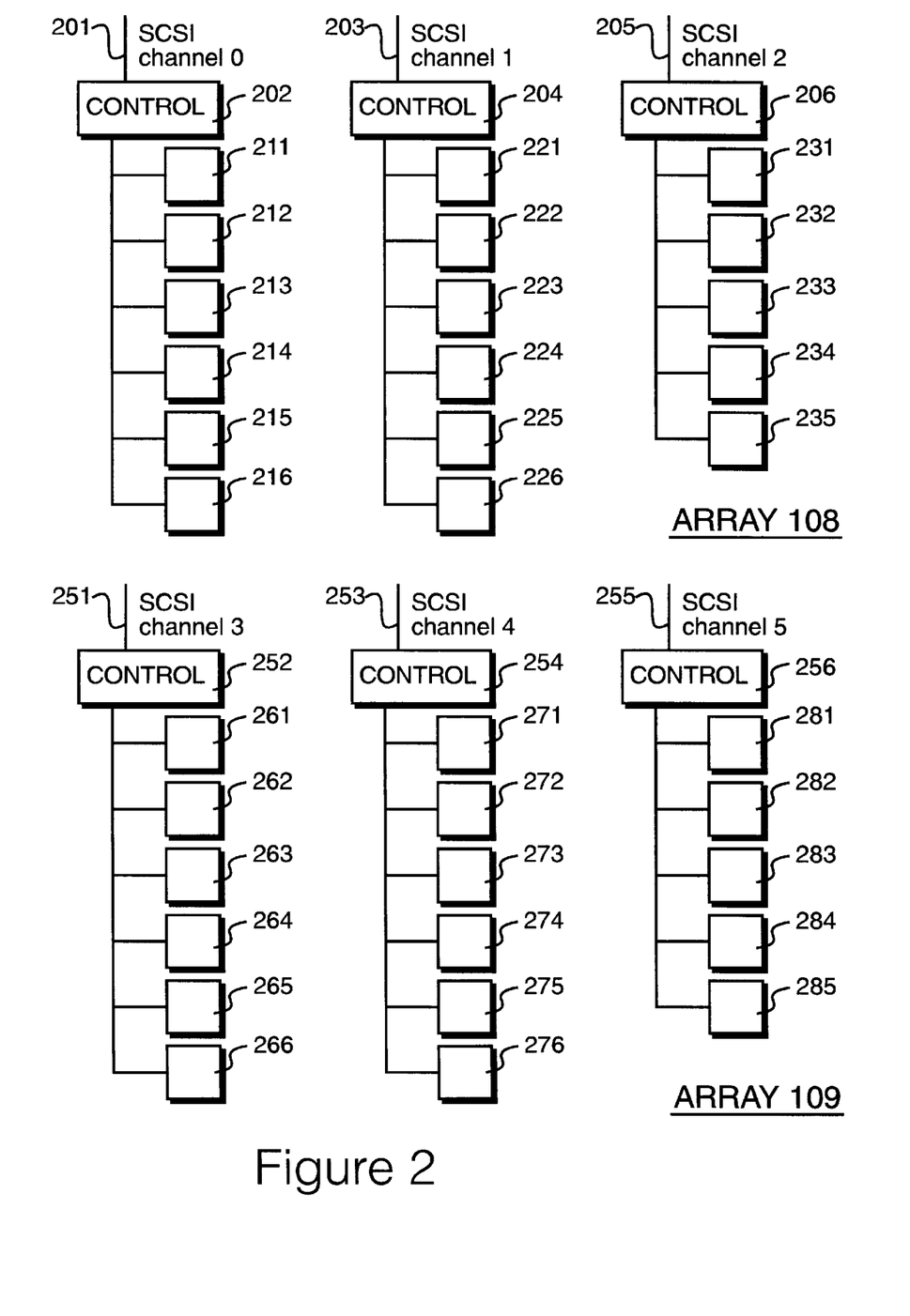
FIG. 2 details the arrangement of the array of disk drives shown in FIG. 1, including individual disk drives.

Configuration of the disk drive arrays 108 and 109 shown in FIG. 1 is detailed in FIG. 2. Array 108 is connected to three SCSI channels. SCSI channel 0, 201, is connected to control circuitry 202. SCSI channel 1, 203, is connected to control circuitry 204. SCSI channel 2, 205, is connected to control circuitry 206. Control circuitry 202 supplies and receives SCSI control and data signals to and from an array of six high capacity hard disk drives, 211, 212, 213, 214, 215 and 216, each having a capacity of two gigabytes of data. The control circuitry 202 and each of the six drives connected to control circuitry 202 are considered as being a SCSI target. The control circuitry is considered as being target zero, drive 211 is target one, drive 212 is target two, drive 213 is target three, drive 214 is target four, drive 215 is target five and drive 216 is target six.

Similarly, SCSI channel 2, 203, communicates with control circuitry 204 and drives 221, 222, 223, 224, 225 and 226, considering these as targets zero to six respectively. SCSI channel 2, 205, similarly communicates with control circuitry 206 and drives 231, 232, 233, 234 and 235.

The array 108 may be considered as comprising a main disk array in which there are three columns and five rows, making a total of fifteen disks. The remaining two disk drives, 216 and 226, are used for parity information and as a spare disk respectively. The parity information may be used to reconstruct data which is lost from a drive in the array, and the spare disk 226 may be used to replace a drive which has suffered a major fault, such as a head crash.

Also shown in FIG. 2 is array 109. This comprises a substantially similar arrangement to that which is shown for array 108, with the exception that connections are made via different SCSI connections. These are SCSI channel 3, 251, SCSI channel 4, 253 and SCSI channel 5, 255. Thus control circuitry 252 is considered as target zero on SCSI channel three, controlling drives 261, 262, 263, 264, 265 and 266, which are considered as being SCSI targets one to six respectively. Control circuitry 254 is considered as being target zero on SCSI channel 4, and drives 271, 272, 273, 274, 275 and 276 are considered as being SCSI targets one to six respectively. Control circuitry 256 is considered as target zero on SCSI channel five, with drives 281, 282, 283, 284 and 285 as SCSI targets one to five. Drive 266 is used to store parity information, and drive 276 is spare.

Figure 3:
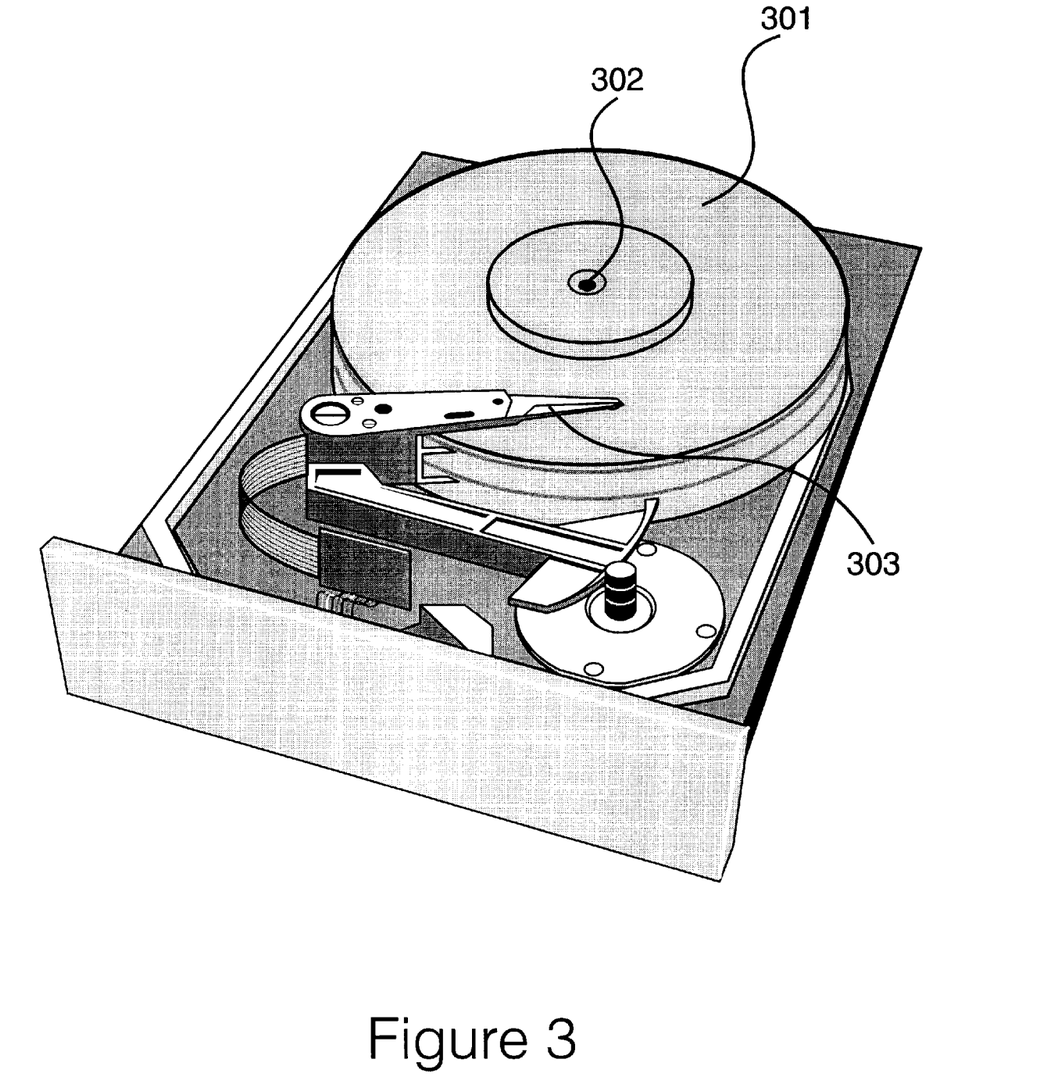
FIG. 3 details an individual disk drive of the type identified in FIG. 2.

A disk drive unit 111 of the type shown in FIG. 1, and indicated in FIG. 2 is illustrated in FIG. 3, having outer casing and seals etc. removed. The disk comprises a rotatable magnetic medium 301 arranged to rotate about a drive shaft 302. The disk is accessed by means of a head 303, arranged to be supported by a cushion of air generated by the rotating velocity of the disk 301 below it. Information on the disk 301 is formatted as a plurality of tracks and sectors and a data access is made by moving the head 303 radially across the disk to the particular circumference at which data is to be written to or read from the disk. The time taken for data to be written to the disk or read from the disk may be considered as being made up of three components. Firstly, it is necessary for the head 303 to traverse radially across the disk in order to locate itself at the appropriate sector for data transfer. Secondly, data transfer can only take place when the disk has positioned itself such that the start of the appropriate sector is directly below the transfer head. Finally, the actual data transfer takes place involving a magnetic interaction between the recording medium 301 and the head itself. If large data transfers occur, using relatively large regions of disk, the time taken for such a transfer to occur will be predominantly dependent on the third component, with the first and second components being relatively small. However, as the area of interaction on the disk becomes smaller, the duration required in terms of the first and second components becomes relatively large, such that the perceived transfer rate will be influenced not so much by the actual rate at which data may be transferred to or from the disk, but in terms of the time taken for the head to traverse across the disk and for the appropriate start of the data to reach the position of the head over the disk.

In known systems it is necessary to define the striping of discs at a stage of system configuration. System configuration is a major undertaking, and cannot be performed on a daily basis. Indeed, the complexity of system configuration is such that it is to be avoided except when it is absolutely essential, such as when a new graphics processor has been purchased and it is necessary to define the striping of disks for all anticipated uses of the disc array.

Figure 4:
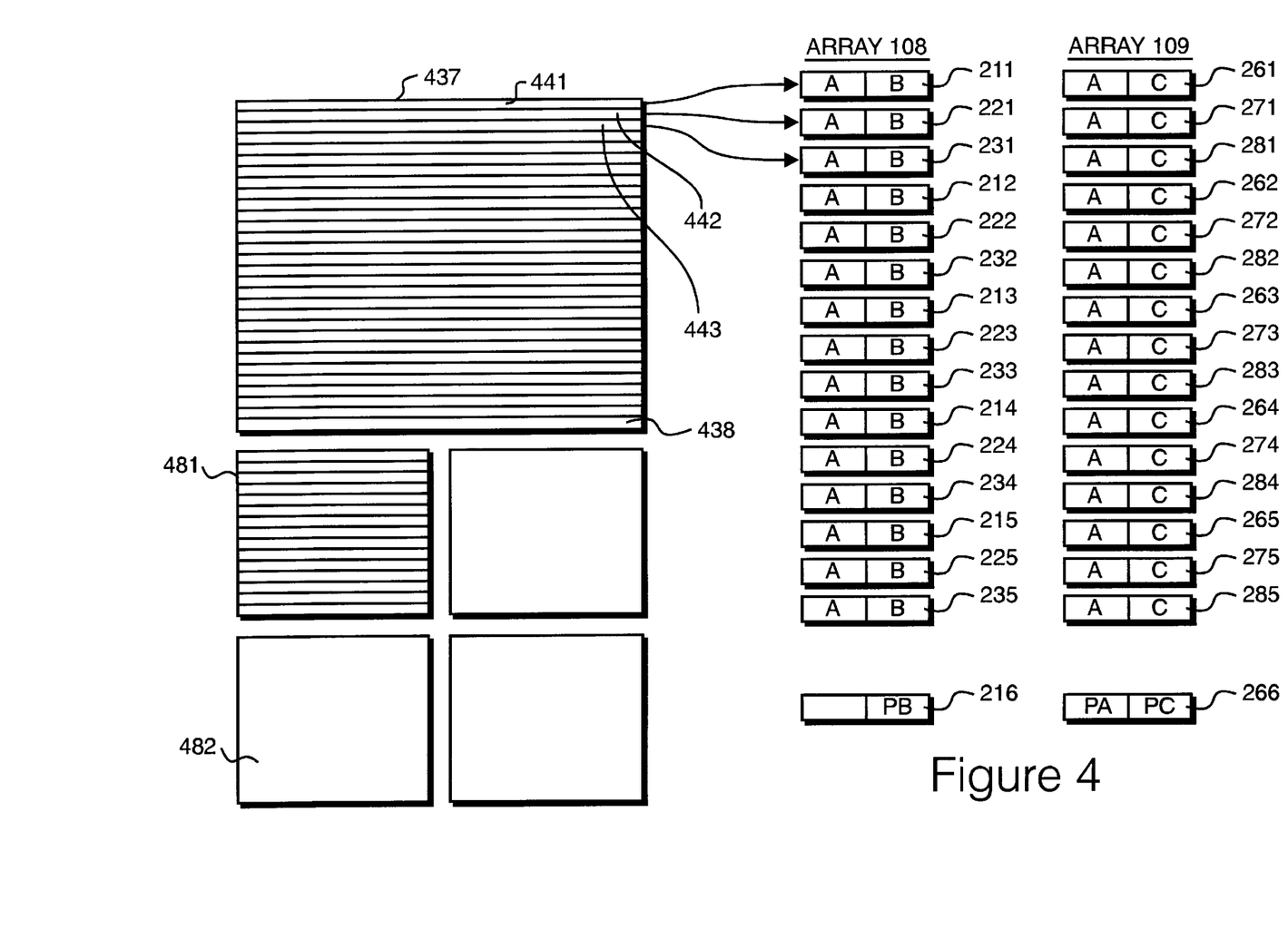
FIG. 4 illustrates frames of image data being striped over the array shown in FIG. 2.

Furthermore, in known systems, the striping of disks for use with particular data formats, such as broadcast quality video frames of NTSC and HDTV, requires that the disks are logically partitioned. Striping, and its relationship with disk partitions, is shown in FIG. 4.

A frame of high definition television (HDTV) data 437 is split into stripes, 441, 442 and 443. Each stripe is supplied to a separate disk drive 211, 221 and 231. The same stripes from preceding and successive frames are sent to these same drives. Thus, although each drive has data capacity for a number of frames, stripes are stored across several drives in order to facilitate the high speed of data transfer that is required for the video transfer of signals at video rate. In the example shown in FIG. 4, HDTV signals are stored on areas of disks designated with the letter A. Thus an area A of each disk has been assigned to the storage of HDTV frames 437.

In a typical video editing studio, more than one type of video signal may be used, depending on the job in hand. Thus, it makes sense to designate an area of each disk for another type of storage, for example NTSC video frames. An NTSC video frame 481, split into stripes, is also shown in FIG. 4. In disk drive array 108, half of each disk has been assigned for storage of HDTV frames, A, and the other half has been designated for storage of NTSC frames B. This allocation is known as a partition, and is fixed at the time of system installation. Thus drive 211 is partitioned into two areas, A and B, for the exclusive use of HDTV and NTSC frame data, respectively.

HDTV frames require considerably more bandwidth for display in real time than NTSC or PAL frames. Thus, although an NTSC frame may be read at sufficient speed from an array 108 of fifteen striped disks 211 to 235 plus parity 216, HDTV frames must be striped over thirty disks: 211 to 235 and 261 to 285 plus parity 266, in order to attain the necessary high bandwidth. Thus two drive arrays 108 and 109 are required. The drives in the second array 109 are striped for use by a third data type, C, for example PAL television signals 482, or some other type of high bandwidth data.

Partitioning of the arrays into areas A, B and C is performed when the system is initially configured, and does not take into account the day-to-day variation in data types which will be experienced when the system is in use. Thus, on days when no HDTV editing is to be done, half of the available disk space is unavailable. Given the cost of such an array, existing solutions provide an inefficient method of allocating disk space.

The drives in the array are permanently partitioned into a single logical area, as opposed to the several areas A, B and C of known systems. The maximum bandwidth required from the array is taken into consideration, and a fixed number of stripes is defined. For example, if the system has to cope with HDTV signals, it will be necessary to define the number of stripes as being set to thirty. Alternatively, if only NTSC, PAL and lower bandwidth signals, such as JPEG2, are to be encountered, the number of stripes may be preset to fifteen.

Figure 5:
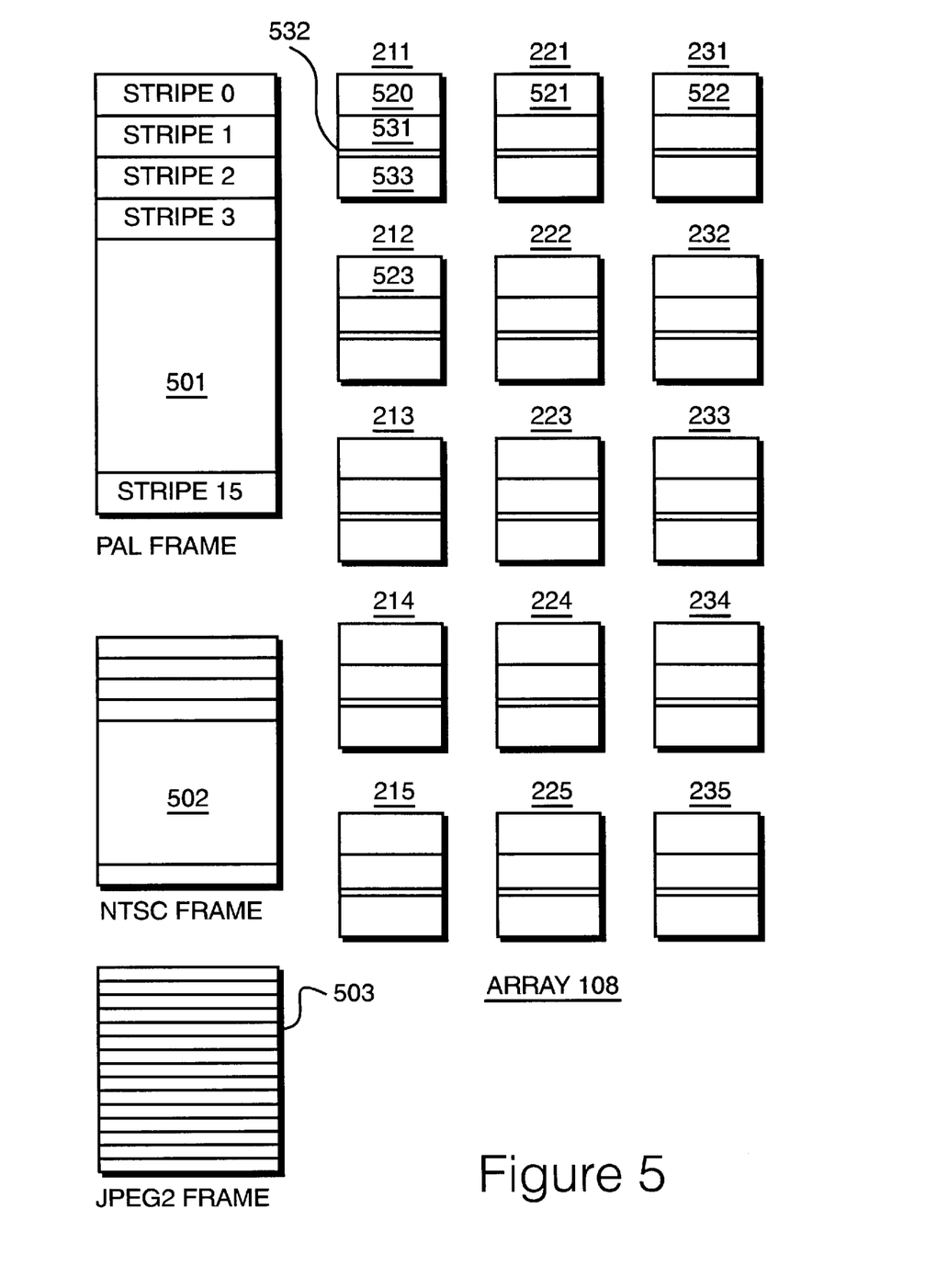
FIG. 5 shows an improved distribution of data over the disk array shown in FIG. 2.

Each frame of video data is divided up into the same number of stripes by the graphics processor 101, regardless of the amount of data in a frame. Thus the size of each stripe, or the striping interval, depends on the amount of data required for a particular frame. An example of a system using a fixed number of fifteen stripes is shown in FIG. 5. An incoming PAL frame 501 is split into fifteen equally sized stripes. Each stripe is supplied to a different drive in the array 108. Thus, stripe 0 from frame 501 is supplied to disk drive 211 and is stored in area 520. Stripe 1 from frame 501 is supplied to area 521 on disk drive 221. Stripe 2 from frame 501 is supplied to area 522 on disk drive 231, stripe 3 from frame 501 is supplied to area 523 on disk drive 212, and so on. Stripes are written substantially simultaneously to all fifteen drives in order to achieve the required high video bandwidth.

Frame 502, shown in FIG. 5, is from an NTSC image data source, requiring slightly less storage than the PAL frame 501. This is also stored as fifteen equal length stripes in the drive array 108. But in this case, each stripe 531 will be slightly shorter than each stripe 520 for the PAL signal. A JPEG2 source frame 503 requires less storage than either the PAL frame 501 or the NTSC frame 502,. This also is split into fifteen equal length stripes 532 for storage on the fifteen drives in the array 108.

Thus, as each incoming frame is supplied to the array 108, a different length of stripe is selected in accordance with the amount of data in each frame. Certain video frame data will include preceding data which indicates the amount of data to follow which will make up a single frame. In this case, it is possible for the graphics processor 101 to divide up image data as it is transferred to the drive array 108 into stripes of the required size, such that fifteen stripes will be used to store the frame. Alternatively, some video sources will not have their frame data size defined before the data is received. In this case it is necessary to buffer the data for the individual frame, measure the size of the data once the frame is completely received, and then allocate a stripe size accordingly. The frame is then transferred from the buffer to the drive array as fifteen correctly sized stripes. Preferably, procedures for manipulating video images include means or procedures for measuring and identifying a frame size before a frame is supplied to a drive array, such that the striping interval may be adjusted without the need to buffer frame data.

Figure 6:
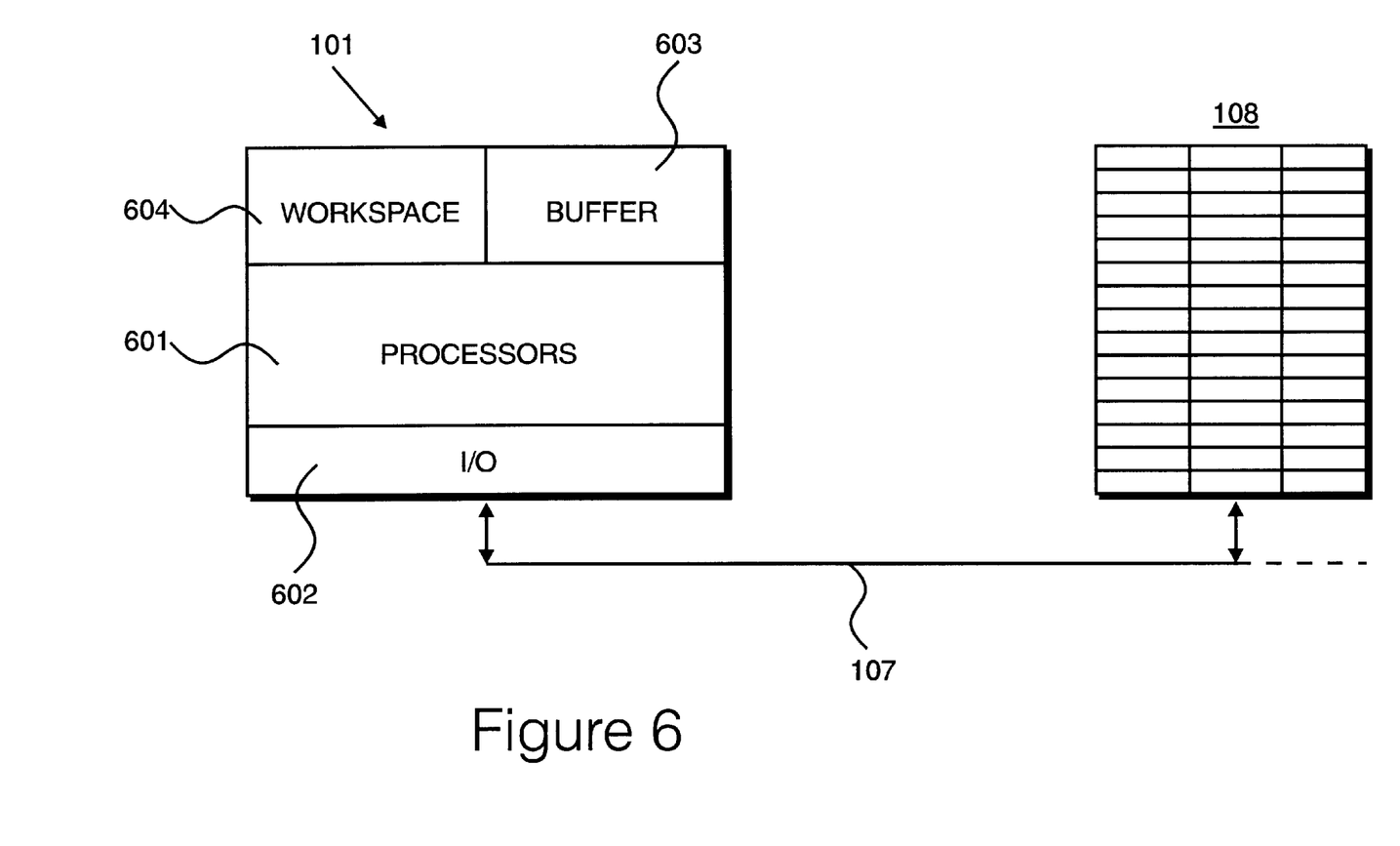
FIG. 6 details the graphics processor shown in FIG. 1.

Details of buffering arrangements for frames of unspecified video frame data sizes are shown in FIG. 6. The graphics processor 101 includes processors 601 and input and output interface circuitry 602 connected to drive arrays such as array 108 via SCSI connections 107. Also included in the graphics processor is an area of memory 603 for buffering image data in order to measure its size before a stripe size is defined. Other memory areas in the graphics processor 101 are used for workspace 604, which is required for intermediate calculations during typical image editing operations.

Typical disk operations are performed in data blocks of 512 data bytes. Thus, each stripe comprises an integer number of these data blocks, even though some degree of wastage may occur.

As shown in FIG. 5, each of the fifteen main drives in the array 108 includes the same subdivision into stripes, but the stripe size is variable. Thus a mechanism is provided by which it is possible to use whatever data space is available in the drive array for whichever format is currently being edited, while maintaining the high bandwidth required for real time image transfer. The subdivisions of the drives shown in FIG. 5 are for diagrammatic purposes only, and many frames of each type of signal may be stored on the array. Thus, in addition to the stripes shown, the pattern of striping would be repeated several times, depending on the number of frames of each type which are stored. Thus, one may consider area 533 on drive 211 to be stripe 0 of the second PAL frame, whereas area 520 is stripe zero of the first PAL frame, and so on.

The example shown in FIG. 5 shows the case for a system set up to provide fifteen stripes. In the case of HDTV editing, this will not provide sufficient bandwidth. Thus, in an alternative arrangement, a combined array of thirty disks plus parity and spare disks, or more, is used, with all frames divided up into thirty stripes or more; the size of the stripes being variable in response to the received image frame data size when writing to the combined array, but the number of stripes being fixed.

Furthermore, video frame data may be considered as a specific instance of high bandwidth data. Thus, the apparatus may be arranged to consider video frames as blocks of data, and other types of data blocks may be advantageously stored.

A problem exists with the solution described so far, in that variable striping intervals have correspondingly variable degrees of speed efficiency with respect to the access times of the hard disks in the array. Thus, while it is necessary to stripe over thirty drives in order to attain the desired bandwidth for an HDTV signal, striping over thirty disks for a much lower bandwidth signal results in a small amount of data being supplied to each disk in the stripe. When small amounts of data are written to each disk, the head access times, which are in the order of several milliseconds, will predominate over the time taken to transfer the small amount of data, thereby reducing the theoretical efficiency of this system.

The level of efficiency becomes particularly important if the same drive array or arrays is being used by several operators to manipulate images of different bandwidths. This puts the drives in the array under considerable pressure, in that the number of random head movements that are necessary will be increased dramatically. Thus, it is possible for the workload of the system to be restricted unnecessarily by the large number of stripes which are used for small bandwidth image data. Furthermore, disk drive failure is related to the frequency of disk head movements, and it would therefore be advantageous to reduce striping inefficiency for this reason.

In the preferred embodiment, the system is initially configured in accordance with the minimum bandwidth which it is necessary to process. Typically, the smallest bandwidth signal is that used for compressed image proxy frames. These are used to represent higher definition signals, such as NTSC, PAL, or possibly film, at a lower bandwidth, such that images may be displayed on a lower cost graphics workstation, such as a Silicon Graphics Indigo.

For example, a sequence from an NTSC image file may be converted into proxy form, for display on a monitor. Video editing personnel may then construct a series of edit decisions, based on what is viewed on the monitor at a low resolution. This may involve re-ordering various parts of the video sequence and so on. Based on these edit decisions, the results may be previewed, again at reduced resolution. Finally, once the edit decisions have been finalised, they may be applied to the full bandwidth signal, which is not viewable on the monitor. A typical compressed image proxy has half the vertical resolution and half the horizontal resolution of its respective high definition original. This results in a bandwidth reduction of a factor of four.

Compressed image proxies from NTSC or PAL originated data may be efficiently striped across four high capacity hard disks. It is this number which is then used as the basis for configuration of the disk array. The combination of the four disks is considered as a sub group. Each sub group of disks includes an additional dedicated parity disk, thus, in this example, each sub group requires five disks. Higher bandwidth signals are striped across integer multiples of sub groups. The combination of sub groups used for striping an individual frame is called a group. The array of drives includes an integer number of sub groups, plus one or a number of spare drives.

As frames are processed by the graphics processor 101 for subsequent storage in an array of drives 108 and 109, the frame is allocated an integer number of sub groups over which it will be striped. Thus, a level of striping efficiency is maintained across multiple data bandwidths, without the need to pre-define a particular area or set of disks for use with a particular type of image or block of data.

What I claim is:

1. Video data storage apparatus, comprising input means, storage means and processing means, wherein said input means receives video frames at a rate substantially equal to or greater than the video display rate, said storage means comprises a plurality of storage devices each arranged to store portions of video frames, and said processing means is configured to analyse the size of an incoming video frame, determine the number of storage devices required to store said video frame and write respective portions of said frame to said required storage devices.

2. Apparatus according to claim 1, wherein said processing means is configured to modify the size of the portions of the video frames stored on said storage devices in response to the size of each incoming frame.

3. Apparatus according to claim 1, wherein said storage devices are configured as a plurality of subgroups and the total number of storage devices used consists of a whole number of said subgroups.

4. Apparatus according to claim 3, wherein each subgroup includes a parity device for storing redundant information.

5. Apparatus according to claim 1, wherein said storage devices are magnetic disks.

6. Apparatus according to claim 1, including means for generating said video frames by scanning cinematographic film.

7. Apparatus according to claim 1, including means for generating high definition video signals.

8. Apparatus according to claim 1, including means for generating broadcast quality video signals, wherein each frame is made up of a pair of interlaced fields.

9. Apparatus according to claim 1, including means for generating compressed video data.

10. Apparatus according to claim 9, wherein said means for generating compressed video data is arranged to generate video data in accordance with JPEG or MPEG recommendations.

11. A method of storing video data, in which video frames are received at a rate substantially equal to or greater than video display rate, and said video frames are striped and stored on a plurality of storage devices, wherein each of said devices is arranged to store a portion of said video frames, and the size of an incoming video frame is analyzed to determine the number of storage devices required to store said video frame, whereafter the divided portions of said video frame are written to the required storage devices.

12. A method according to claim 11, wherein the size of each stripe is modified in response to the size of each incoming frame.

13. A method according to claim 11, wherein storage devices are configured as a plurality of sub groups and the total number of storage devices used consists of a whole number of said sub groups.

14. A method according to claim 13, wherein each of said sub groups includes a parity device for storing redundant information.

15. A method according to claim 1, wherein the storage devices are magnetic disks.

16. A method according to claim 11, wherein said video frames are derived by scanning cinematographic film.

17. A method according to claim 11, wherein said video frames comprise high definition video frames or fields.

18. A method according to claim 11, wherein said video frames comprise broadcast quality interlaced fields.

19. A method according to claim 11, wherein said video data comprises compressed video data.

20. A method according to claim 19, wherein said compressed video data is compressed in accordance with a JPEG or MPEG recommendations.

* * * * *